US012726220B2

(12) United States Patent
Hang et al.

(10) Patent No.: US 12,726,220 B2
(45) Date of Patent: Sep. 1, 2026

(54) SYSTEM AND METHOD FOR NEURAL NETWORK AIDED INTERFERENCE ESTIMATION

(71) Applicant: NovAtel Inc., Calgary (CA)

(72) Inventors: Robert Hang, Calgary (CA); Graham Fader, Calgary (CA)

(73) Assignee: NovAtel Inc., Calgary (CA)

( * ) Notice: Subject to any disclaimer, the term of this patent is extended or adjusted under 35 U.S.C. 154(b) by 171 days.

(21) Appl. No.: 18/440,108

(22) Filed: Feb. 13, 2024

(65) Prior Publication Data

US 2025/0260430 A1 Aug. 14, 2025

(51) Int. Cl.
*H04B 1/10* (2006.01)

(52) U.S. Cl.
CPC .................................. *H04B 1/1036* (2013.01)

(58) Field of Classification Search
CPC .. H04B 1/1036; H04B 17/345; H04B 1/1027; G06N 3/08
See application file for complete search history.

(56) References Cited

U.S. PATENT DOCUMENTS 11,181,634 B1 11/2021 Lue
11,988,753 B2 5/2024 Hang et al.
2018/0024248 A1 1/2018 Orejas
2020/0151554 A1* 5/2020 Siraj ..................... H04W 16/22
2021/0334626 A1* 10/2021 Hang .................. G06N 3/0455
2021/0367681 A1 11/2021 Hess et al.
2023/0328545 A1 10/2023 Mody et al.

FOREIGN PATENT DOCUMENTS

| | | | |
|---|---|---|---|
| CN | 109188470 | | 1/2019 |
| CN | 110231634 | | 9/2019 |
| CN | 110515096 | | 11/2019 |
| CN | 111399002 | | 7/2020 |
| CN | 111783558 | | 10/2020 |
| CN | 111399002 | B | 6/2022 |
| CN | 116488750 | A | 7/2023 |
| EP | 3904912 | A1 | 11/2021 |

OTHER PUBLICATIONS

U.S. Appl. No. 17/982,021, filed Mar. 2, 2023, Hang, Robert, et al.
European Search Report mailed Sep. 16, 2021 for European Application No. 21170985.2 for NovAtel Inc., 7 pages.

(Continued)

*Primary Examiner* — David S Huang
(74) *Attorney, Agent, or Firm* — Cesari and McKenna, LLP

(57) ABSTRACT

A system and method for utilizing a neural network or other artificial intelligence to identify windows of potential interference in a radio frequency signal is provided. The identified windows are then utilized in a rules-based interference detection system to identify a center, upper, and lower frequencies of the interference. The identified interference may then be remediated using conventional techniques.

16 Claims, 9 Drawing Sheets

(56) References Cited

OTHER PUBLICATIONS

"Detecting Interference and Classification in Global Navigation Satellite Systems Based on Machine Learning Techniques," Masters Thesis by Iman Ebrahimi Mehr for Politecnico Di Torino, Apr. 2021, 96 pages.
Phelts, Robert Eric, "Multicorrelator Techniques for Robust Mitigation of Threats to GPS Signal Quality," Doctor of Philosophy Thesis submitted Jun. 2001 to Stanford University, 345 pages.
Knocklein, Oliver, "Classification Using Neural Networks," *Towards Data Science,* Jun. 5, 2019, 9 pages.
Kamel, "Context Aware High Dynamics GNSS-INS for Interference Mitigation," Doctor of Philosophy Thesis submitted Aug. 2011 to University of Calgary, 218 pages.
EP Search Report, dated Mar. 7, 2025, EP Patent Application No. 24198064, 9 pages.

* cited by examiner 900A
905
740
NEURAL NETWORK
910

900B
910
745
RULES BASED SYSTEM
915
$f_{3dB}$(upper)
$f_{3dB}$(lower), $f_0$ 900C
905
735
FILTER
920
[$f_{3dB}$(lower), $f_0$, $f_{3dB}$(upper)]

SYSTEM AND METHOD FOR NEURAL NETWORK AIDED INTERFERENCE ESTIMATION

BACKGROUND

Radio frequency (RF) interference is a common problem that may be caused by a variety of factors, e.g., local cellular telephone towers, intentional and unintentional jammers, spurious transmissions, etc. To improve the quality of a received RF signal, the interference needs to either cease (e.g., by relocating to an area where the interfering signal does not reach) or be mitigated (e.g. filtered) out of the received RF signal. A necessary step prior to mitigating interference is to first detect it and then characterize (i.e. estimate) its parameters such as center frequency and bandwidth using a rules-based system and feed that information to a filter may remove the interference with minimal disruption to the signal of interest.

In a typical rules-based system that characterizes interference, the system identifies the center frequency of the interference as well as an upper and lower frequency where the interference has reached a predetermined drop off, e.g., 3 dB in signal strength. A noted disadvantage of such rules-based systems arises in certain situations where the rules-based system performs poorly. Examples of such situations include, e.g., where the frequency range containing the interference is too broad, or when the received signal contains a plurality of small areas with local minimums, noise, and/or background signals. In these environments, a rules-based approach may result in the identification and characterization of an interfering signal that is not true interference (i.e. a false positive), or where an actual interfering signal is not accurately characterized.

In these situations, the improperly identified interference may result in an incorrect mitigation strategy (e.g. inaccurate filter properties), which may cause an unacceptable degradation of the signal of interest by filtering out portions of the signal that are not interference. This may result in the filtered signal not being able to be used for its intended purpose, e.g., broadcast information of a global navigation satellite system (GNSS), communication, data transfer, etc.

SUMMARY

The disadvantages of the prior art are overcome by the system and method for neural network aided interference estimation disclosed herein. In operation, a received RF signal is first transformed from the time domain to the frequency domain. A trained neural network is then used to analyze the received signal to identify if interference exists within one or more "windows" of the received signal. If the neural network identifies one or more windows that are likely to contain interference, those windows are fed into a rules-based system to identify and characterize the interference. Such identification includes identifying a center frequency and a lower and upper frequency that delineate a predefined power drop off, e.g., 3 dB.

Illustratively, the identified interference may then be mitigated by, e.g., filtering it out. In alternative embodiments the identified and characterized interference information may be passed off to another module for further processing. By use of the neural network to identify areas with likely interference, the input to the rules-based system is more controlled, which significantly reduces the occurrence of incorrectly identified and characterized interference.

BRIEF DESCRIPTION OF THE DRAWINGS

The above and further advantages of the present invention are described in conjunction with the accompanying figures, in which like reference numerals indicate identical or functionally similar elements, of which.

DETAILED DESCRIPTION

Figure 1:
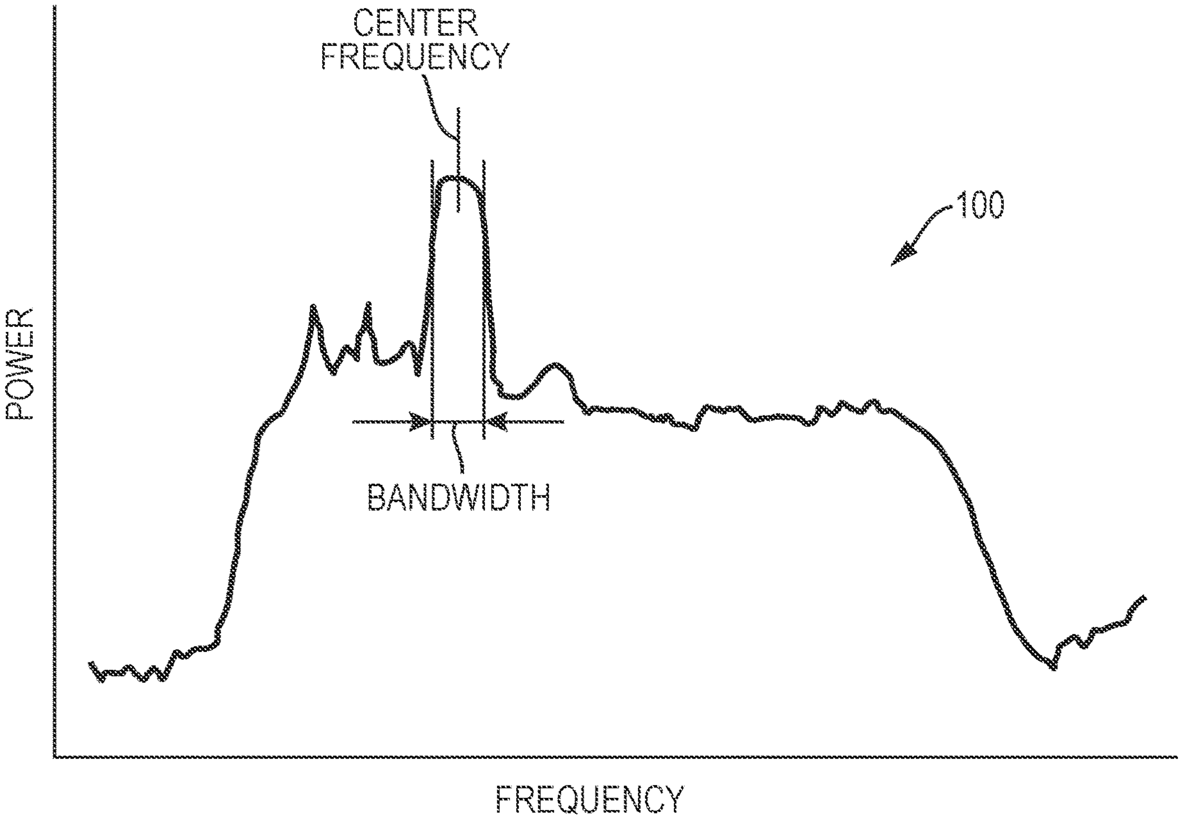
FIG. 1 is an exemplary frequency graph illustrating the identified center frequency and bandwidth of an interfering signal in accordance with an illustrative embodiment of the present invention.

FIG. 1 is an exemplary power-frequency graph 100 illustrating identification of a center frequency and bandwidth of an interfering signal in accordance with an illustrative embodiment of the present invention. Illustratively, the signal contains a localized peak of interference that has a center frequency and has a particular bandwidth, which equates to predefined power drop off, e.g., 3 dB. It should be noted that, as used herein, the principles of the present invention are described as identifying interference as having a center frequency and a lower and upper frequencies of the interference being at a point that is 3 dB lower than the maximum power over the frequency range. However, it should be noted that in alternative embodiments of the present invention the lower and upper frequencies may be defined with a power drop smaller or larger than 3 dB from that of the center frequency. Therefore, it should be noted that the description contained herein of a 3 dB power drop off delineating the bandwidth of an interfering signal should be taken as exemplary only.

Figure 2:
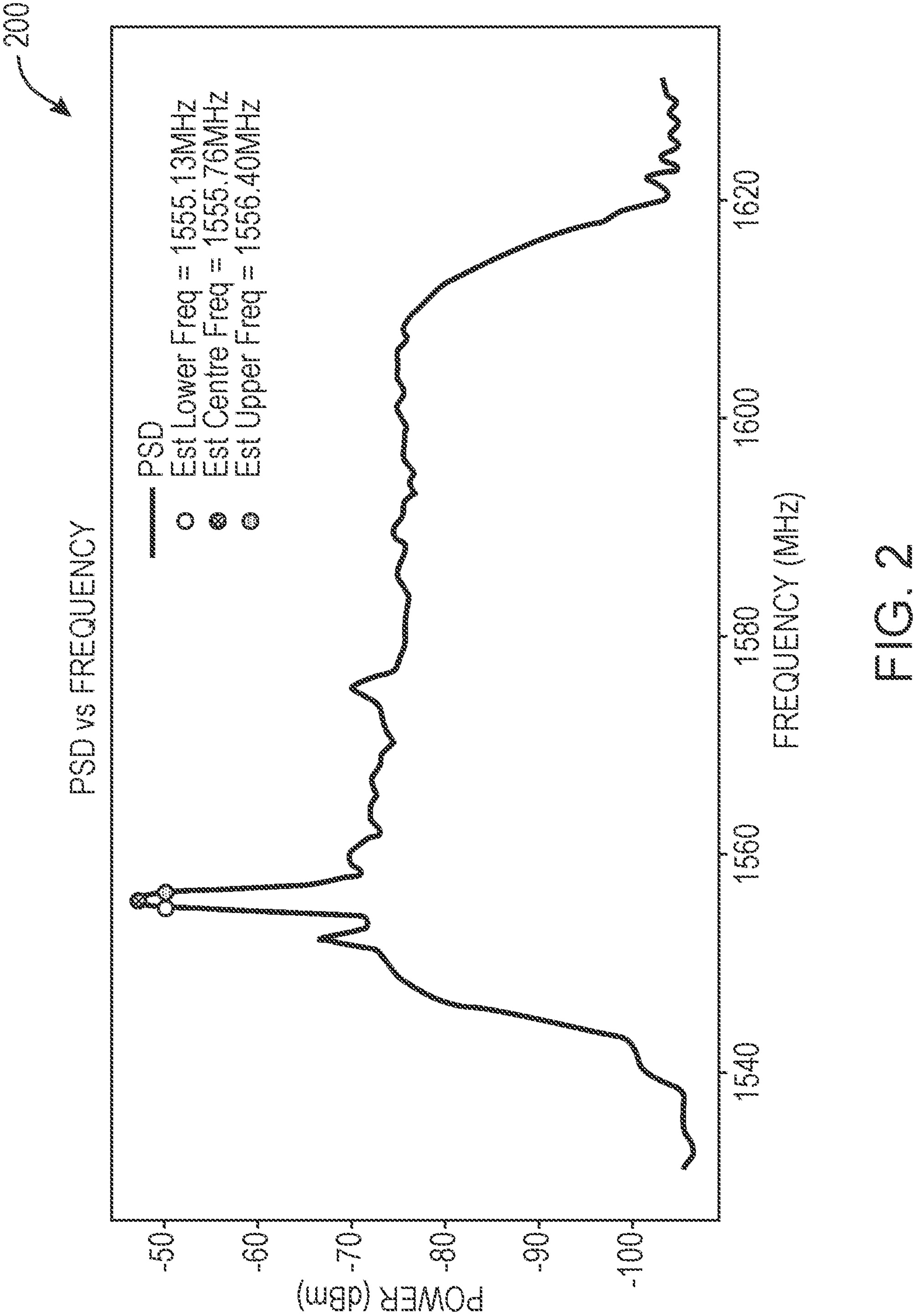
FIG. 2 is an exemplary frequency graph illustrating identification of a center frequency and bandwidth accordance with an illustrative embodiment of the present invention.

FIG. 2 is an exemplary power-frequency graph 200 illustrating identification of a center frequency and bandwidth in accordance with an illustrative embodiment of the present invention. Illustratively, graph 200 shows the results of a rules-based system when the interfering signal is substantially more powerful than the signal of interest and is narrowband relative to the frequency range of interest. Graph 200 contains a single peak of interference which an exemplary rules-based system has identified including an estimated center frequency, lower frequency, and upper frequency. In such environments conventional rules-based systems typically perform quite well.

Figure 3:
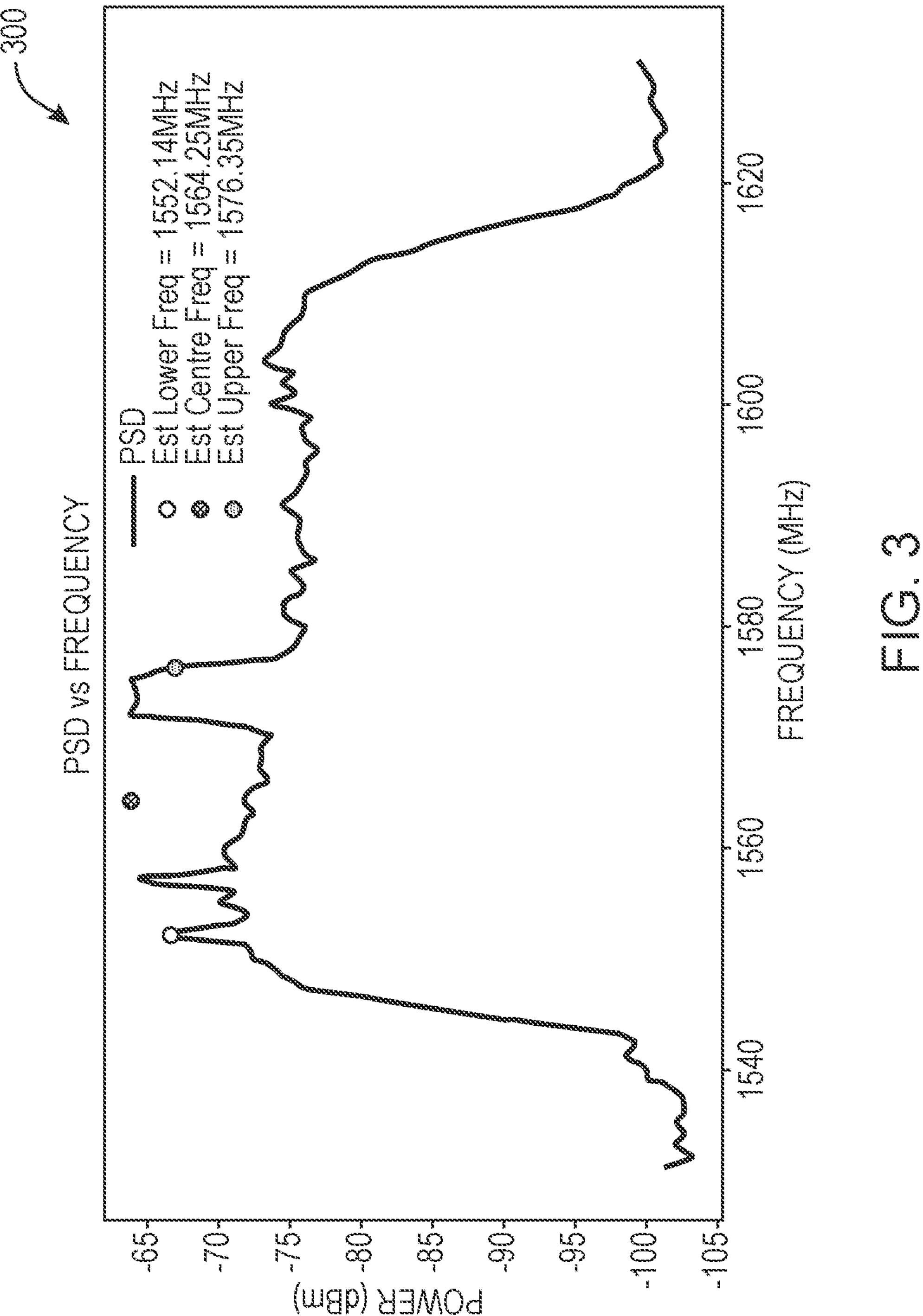
FIG. 3 is an exemplary frequency graph illustrating disadvantages of a rules-based approach.

However, in environments where the power of the interference is similar to the received power of the signal of interest, or where the interference is spread out, or there are multiple peaks of interference power, conventional rules-based systems may not operate as efficiently. This is illustrated in FIG. 3, which shows a wider variety of signals including several local maxima. In exemplary graph 300, a conventional rules-based system identifies an inaccurate lower and upper frequencies resulting in a wrong estimate for center frequency and bandwidth for the interference. In such environments, a rules-based system operating alone will incorrectly identify the interfering signal. Thus, any filtering performed based on the results of such improper detection and classification cannot be used to improve the signal quality for the underlying signal of interest.

Figure 4:
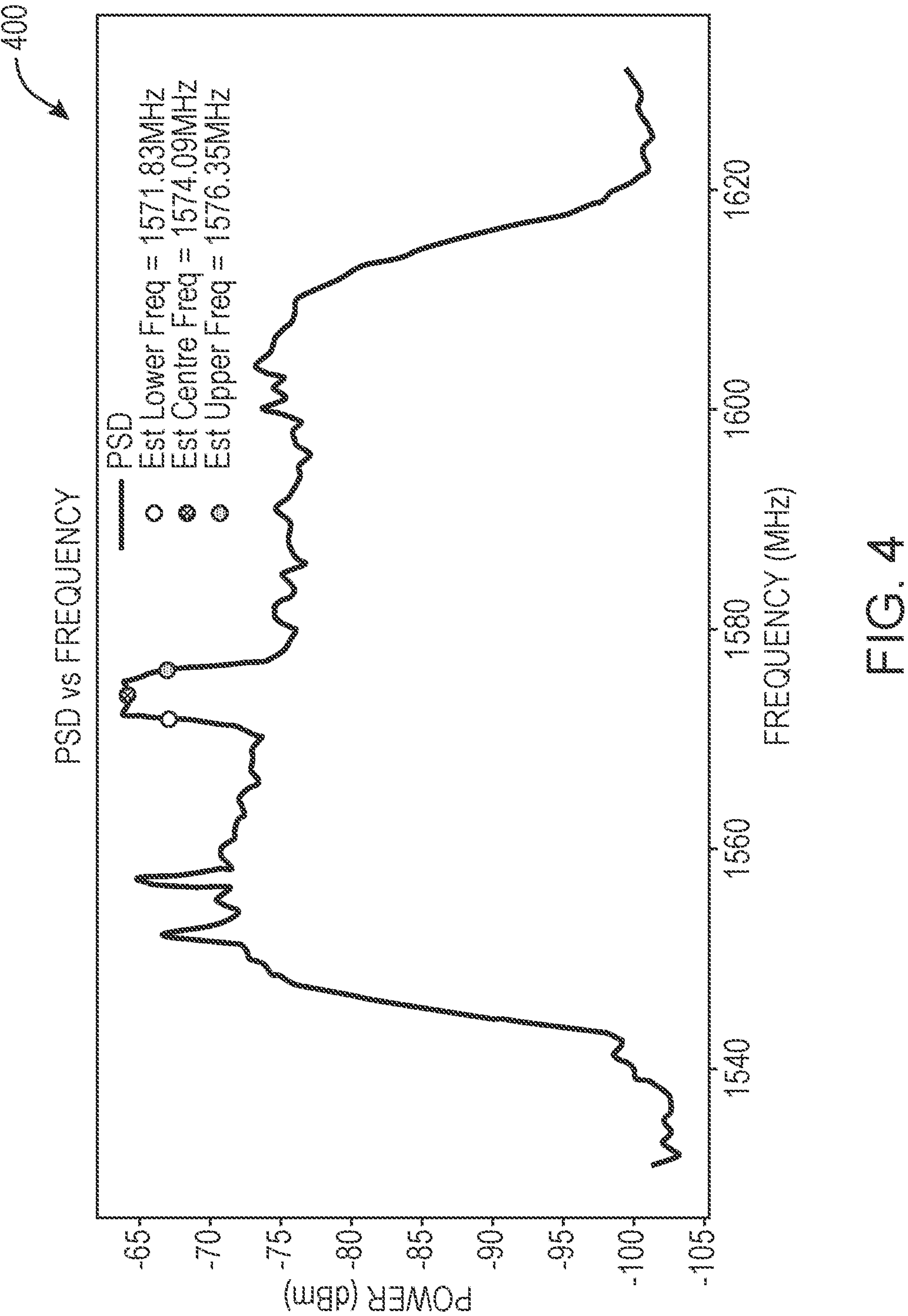
FIG. 4 is an exemplary frequency graph illustrating desired interference detection in accordance with an illustrative embodiment of the present invention.

FIG. 4 is an exemplary power-frequency graph 400 illustrating the results of interfering signal detection utilized on the same signal as FIG. 3. when utilizing an illustrative embodiment of the present invention as disclosed herein. Graph 400 illustrates that the system and method have correctly identified the center and upper/lower bounds of the interfering signal. This is the desired result. The system and method described herein enables the correct identification of an interfering signal when the received RF signal is not ideal for a conventional rules-based-only interference detection system.

In accordance with an illustrative embodiment of the present invention, a trained neural network is utilized to determine frequency windows which are used to aid a rules-based system for interference characterization. One such neural network is described in U.S. patent application Ser. No. 17/982,021, entitled GNSS-RECEIVER INTERFERENCE DETECTION USING DEEP LEARNING, filed on Nov. 7, 2022. However, it should be noted that any suitable neural network (or other form of artificial intelligence or machine learning) that can perform the indicated functionality may be utilized. Therefore, the description of a particular neural network as being utilized, or a particular training schema should be taken as exemplary only.

The description contained herein relates to the above-reference U.S. patent application. Illustratively, the system distinguishes different types of RF environments seen by a RF receiver as different classes of interference, and then using a neural network classifies the interference at the receiver into one or more of these RF environment classes (and thereby detect interference at the receiver). For example, an interference-free RF environment can be considered a class to be detected just like an RF environment with interference. Interference environments can be further classified into in-band (IB) or out-of-band (OOB) interference. Some classes can then be split to create new classes, e.g., weak IB and strong IB interference. Such a neural network is trained and validated using the data associated with defined or pre-defined classes of RF interference experienced by an RF receiver.

Figure 5:
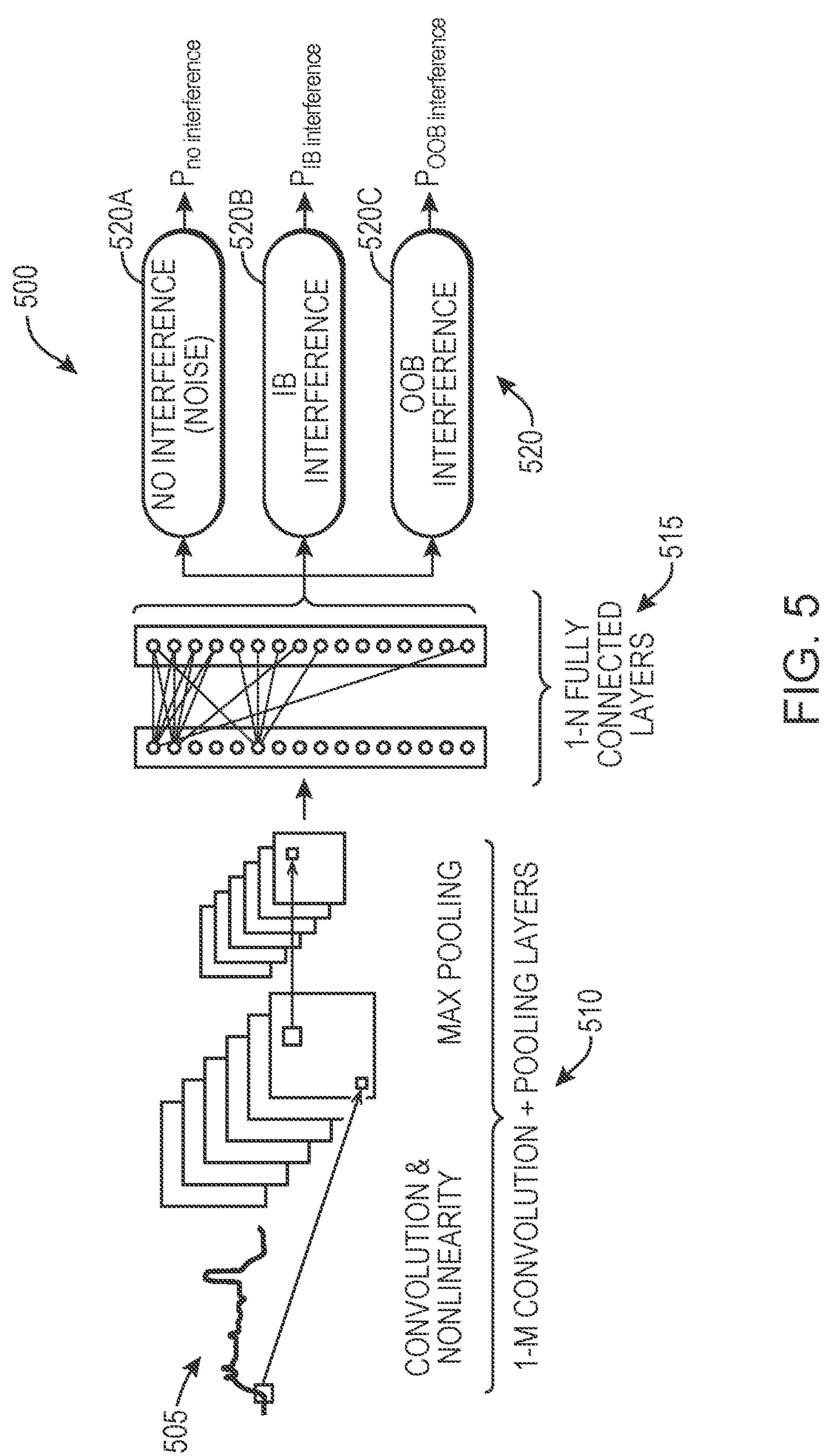
FIG. 5 is an exemplary block diagram of a neural network in accordance with an illustrative embodiment of the present invention.

The data that are associated with the interference classes can be of any receiver metric that well characterizes the classes, e.g., power spectral density (PSD), carrier-to-noise ratio (C/No), pseudo-noise tracking error, estimated positioning error, cross-ambiguity function (CAF) which is the correlation of the code against the incoming time domain GNSS signal as a function of frequency offset and code phase, etc. Once trained to the required performance level, the neural network is used in a prediction mode where receiver input metrics can then be processed, with the neural network outputting results for each of the classes. The class with the highest output metric is then selected (classified) as the detected RF environment. In the situation where a new type of interference needs to be supported, data for this new type of interference needs to be collected and/or synthetically created (e.g., PSD with that new type of interference). The neural network is then re-trained/re-tuned against that new data and the data of all previously known interference types. This is in contrast with prior art rules-based algorithms for which characterization of the new interference requires creation of a new rule, i.e., creation of a new detector algorithm, representing a significant undertaking. An aspect of the present disclosure is directed to using artificial neural networks (which may variously be referred to as "ANNs," "NNs," or "neural networks") for the classification and detection of interference in or by RF receivers. A neural network, or group of neural networks, is utilized as a detector that is capable of detecting any type of interference. A neural network can perform interference detection by classification based on one or more characteristics. For example, a neural network can classify a type of interference from power spectral densities (PSD) values directly. Suitable types of neural networks that may be used within the scope of the present disclosure include, but are not limited to, ANNs, convolutional neural networks ("CNNs"), and recurrent neural networks ("RNNs"), among others. FIG. 5 depicts a diagram of an example of an ANN architecture 500 embodiment of the present disclosure. As shown, ANN 500 includes a number of input images, e.g., power spectral densities (PSDs) of GNSS signals received at a receiver. The pixel values of one or more input images are provided to an input layer of a fully connected section that also has an output layer and a number (N) of hidden layers.

In exemplary embodiments, convolutional neural networks (CNNs) can be used as detectors. Working as image classifiers, CNNs can use PSDs as images. By virtue of processing images, CNNs have the advantage that they can readily be used for visual aid such as highlighting the zone of the spectrum where interference is located. FIG. 5 depicts a diagram of an example of a CNN architecture 500 in accordance with the present disclosure.

As shown in FIG. 5, CNN 500 includes an input image 505, e.g., a PSD (as shown), a convolutional and pooling section 510 with a number (1-M) of convolutional and pooling layers, a fully connected section with a number (1-N) of fully connected layers 515, and an output section 520. The output section includes a number of nodes, e.g., three, for classification. In exemplary embodiments, a softmax function may be used for the classification. The convolutional and pooling section 510 can include one or more convolutional layers and one or more pooling layers. A convolutional layer can be cascaded with another convolutional layer or a pooling layer. Similarly, a pooling layer can be cascaded with a convolutional layer or a pooling layer or may be connected to a fully connected layer, e.g., of the fully connected section 515.

In operation of CNN 500, the convolutional and pooling section 510 implements a convolutional 2D filter (kernel) for feature extraction of an input, e.g., input PSD image. Max pooling reduces the spatial size of the convolved feature(s). After the convolution and pooling operations are performed by the convolution and pooling section, the fully-connected section 515 is used to learn non-linear combinations of the features (e.g., high-level features) that are represented by the output of the convolution and pooling section 510. A flattening layer can be used for some applications for the fully-connected section 515. The output section 520 receives the output of the fully-connected section 515 and then classifies the input images, e.g., PSDs, accordingly. As a preliminary step, one or more appropriate data sets can be utilized for training and validation purposes for the CNN 500.

The CNN 500 may have any type of suitable CNN configuration, e.g., LeNet, AlexNet, VGG, VGGNet, GoogLeNet, ResNet, ZFNet, XCeption CNN, Inception v3 or v4, or the like. In some applications, a dilated convolution 2D filter may be used, e.g., to reduce computation costs or accommodate a certain computation performance level. In some applications, valid padding or same padding may be used for the convolution layer(s), e.g., when it is desired to increase or keep same the dimensionality of an input image. In exemplary embodiments, different types of neural networks can be combined, e.g., T cascaded, for detection. For example, an ANN can be followed by a CNN if some refinements are needed or desired, etc.

Figure 6:
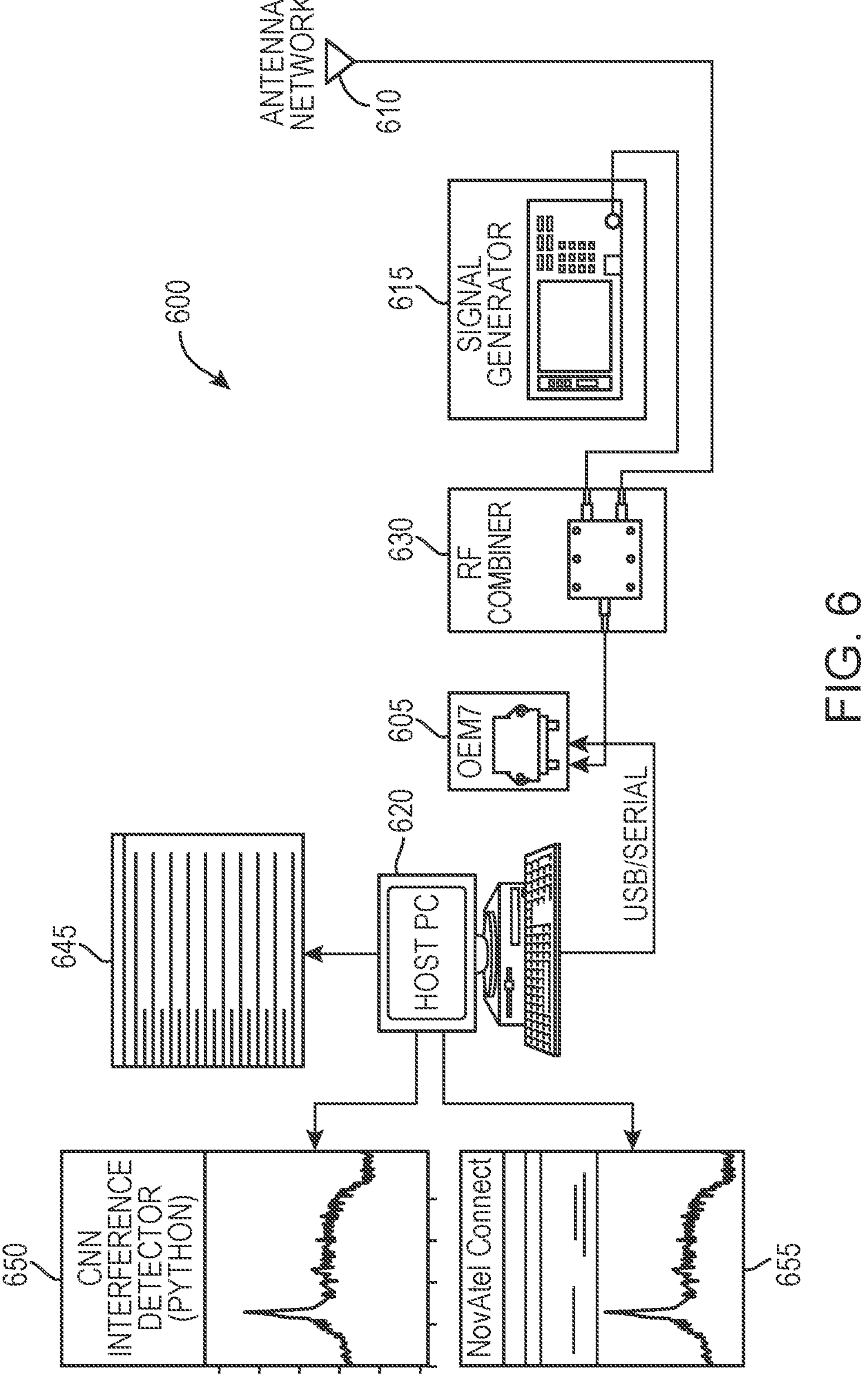
FIG. 6 is an exemplary block diagram of a neural network training environment in accordance with an illustrative embodiment of the present invention.

FIG. 6 depicts a diagram of an implemented interference classification and verification system 600 in accordance with the present disclosure. The system 600 includes a GNSS receiver 605, connected to an antenna 610 and a personal computer (PC) 620. Signal generator 615 was used to add various noise and signal profiles to simulate different RF environments for classification. The output of the signal generator and antenna 610 are combined by RF combiner 630 prior to being passed to the GNSS receiver 605. The prototype embodiment 600 was implemented using a main Python script 645 resident on PC 620. The PC 620 also implemented NovAtel Connect™ 655 as a graphic user interface (GUI). NovAtel Connect™ is a Windows-based GUI that allows a user to access a NovAtel receiver's many features without the need to use a terminal emulator or to write special software and allows the user to easily communicate and configure the receiver via serial port, USB or ethernet connection using a PC running the Windows® operating system. The Python script 645 consisted of a block configured for retrieving power spectral density (PSD) logs from a receiver (NovAtel OEM7 receiver) and performing detection of three classes of radio-frequency (RF) environments: no interference, in-band (IB) interference and out-of-band (OOB) interference all in real-time.

For the implemented prototype embodiment, a first layer was used to input power spectral density (PSD) images 650, which were in a 128×128 pixels format. Eight (8) convolutional layers were then used to process the images, using a 6×6 kernel (window filter) for feature extraction using max pooling. The last convolution layer then was connected to a fully connected layer with 32 neurons, which used the ReLU activation function. An output layer of three (3) neurons was then used to output classification determinations of one of three interference environments, using a soft max activation function.

For training purposes, 26,500 PSD images were used; 14,000 were used for validation. The PSD images were labeled with the following labels: (i) type of interference, (ii) frequency, (iii) power level, and (iv) bandwidth of interference. An accuracy of detection of 98.80% was obtained during the off-line validation of the deep learning-based interference detector against captured PSD logs.

While the above description has been provided in the context of using CNNs and ANNs, other types of neural networks such as recurrent neural networks (RNNs) and Restricted Boltzmann Machines (RBMs) can be used within the scope of the present disclosure, as one skilled in the art will appreciate.

Figure 7:
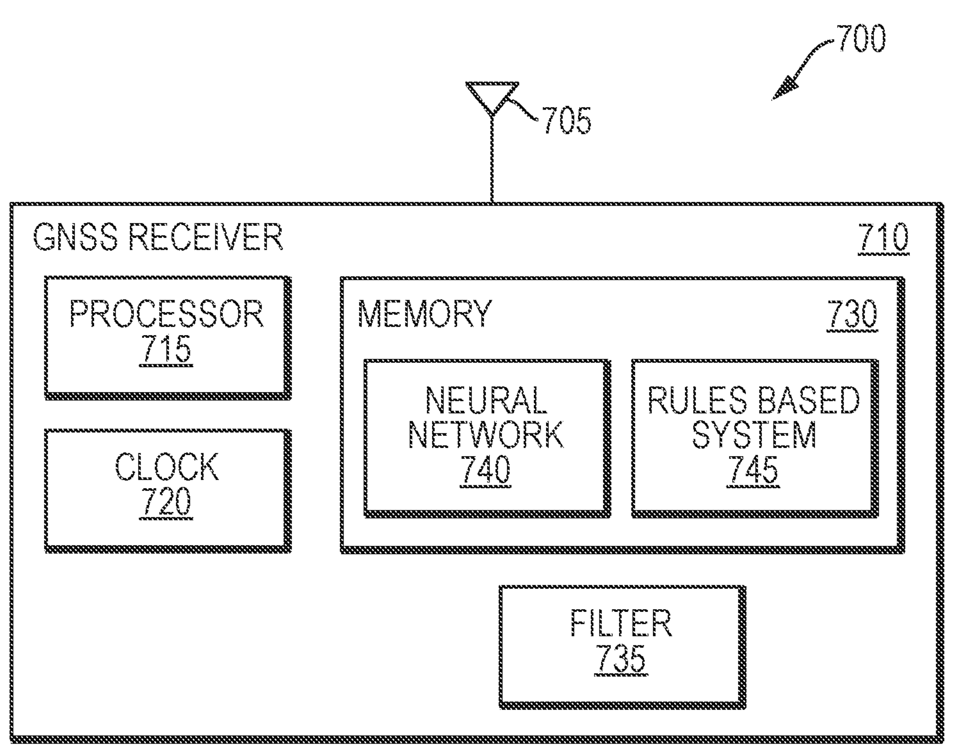
FIG. 7 is a schematic block diagram of an exemplary radio frequency (RF) receiver in accordance with an illustrative embodiment of the present invention.

FIG. 7 is a schematic block diagram of an exemplary radio frequency receiver environment 700 in accordance with an illustrative embodiment of the present invention. Illustratively, the receiver 710 is shown as a GNSS receiver. However, the principles of the present invention may be utilized in non-GNSS RF environments. Therefore, the description of a GNSS receiver being utilized should be taken as exemplary only.

Exemplary receiver 710 comprises a processor 715, clock 720, memory 730, and filter 735. The receiver 710 is operatively connected with an antenna 705 used to receive RF signals. In accordance with alternative embodiments of the present invention, a plurality of antennas 705 may be utilized. Therefore, the depiction and description of a single antenna 705 should be taken as exemplary only.

The processor executes software stored in memory 730. As will be appreciated by those skilled in the art, the GNSS receiver includes a clock 720. Memory may comprise software modules, such as exemplary neural network 740 and rules-based system 745. Filter 735 may be utilized to filter out identified interfering signals in accordance with illustrative embodiments of the present invention.

It should be noted that while neural network 740 and rules-based system 745 are shown as being implemented in software, in accordance with alternative embodiments of the present invention, either or both of such modules may be implemented in hardware. Similarly, while filter 735 is shown as a hardware component, it may be implemented in software. More generally, any component may be implemented as software, hardware, firmware, or a combination thereof. Therefore, the description of any component being hardware/software should be taken as exemplary only.

As will be appreciated by those skilled in the art, RF receivers for use in non-GNSS environments may have additional and/or differing components.

Figure 8:
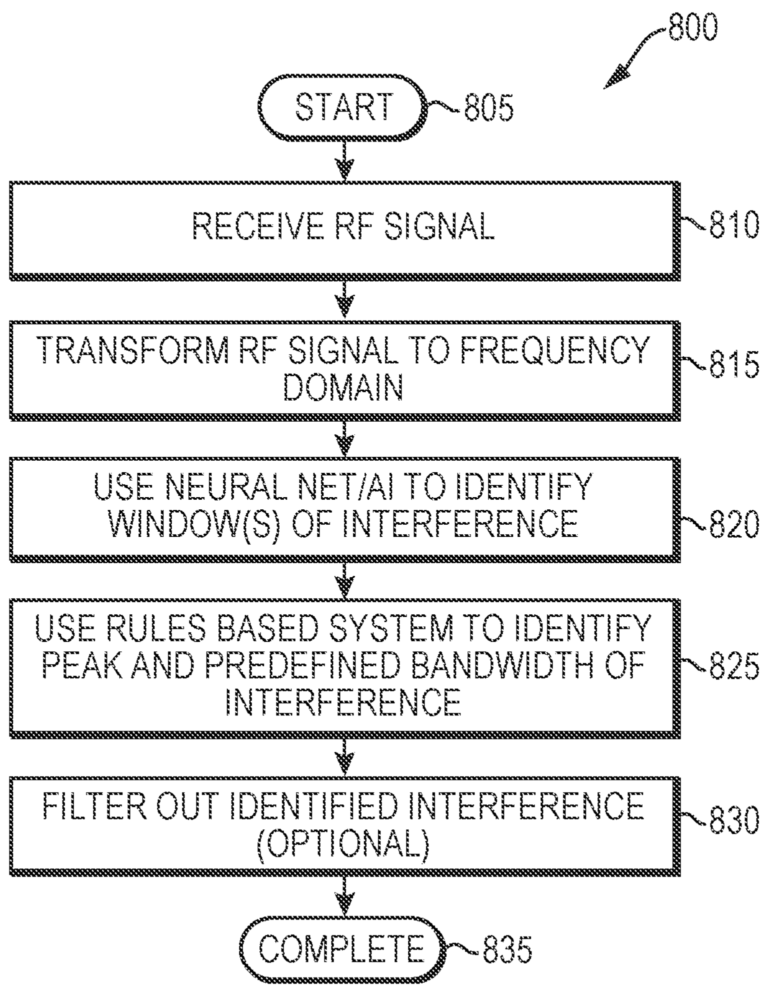
FIG. 8 is a flowchart detailing the steps of a procedure for identifying and removing interference in accordance with an illustrative embodiment of the present invention.

FIG. 8 is a flowchart detailing the steps of a procedure 800 for identifying and optionally removing interference in accordance with an illustrative embodiment of the present invention. The procedure 800 begins in step 805 and continues to step 810 where a radio frequency (RF) signal is received. Illustratively, the RF signal is received at antenna 705. The RF signal may comprise a desired signal of interest as well as potentially one or more interfering signals. The principles of the present invention may be utilized to effectively identify and mitigate the interfering signal(s).

Once the RF signal has been received, the signal is transformed from the time domain to the frequency domain in step 815. Illustratively, this is performed using conventional Fast Fourier Transforms (FFT) as is well known in the art.

After the received RF signal is transformed to the frequency domain, a neural network is utilized to identify one or more windows of expected interference in step 820. As described above, the neural network passes through the received RF signal and identifies areas that contain interference. These identified windows are noted and passed as the input to a rules-based system. In accordance with illustrative embodiments of the present invention, these windows are narrow in frequency width so as to avoid multiple peaks, etc., that may cause problems with rules-based systems.

In step 825, a rules-based system is utilized to identify the peak (center frequency) and predefined bandwidth (e.g., the bandwidth associated with a 3 dB power drop off) associated with the interference in the received signal. This may be performed using conventional rules-based systems. However, as the window provided to the rules-based system is sufficiently narrow to avoid inputs having characteristics that may cause the rules-based system to generate incorrect results, the determination of the rules-based system is markedly improved compared to using a rules-based system on the entire received RF signal. Illustratively, the rules-based system identifies a peak (center frequency) as well as an upper and lower bandwidth of the interfering signal.

Illustratively, the center frequency is identified, and the upper/lower frequencies (defining the total bandwidth of the interfering signal) are identified as the frequencies where a predefined power drop off has occurred. As noted above, illustratively, this power drop off is defined as a 3 dB power drop off. However, it is expressly noted that in alternative embodiments of the present invention other power drop off levels may be utilized. Therefore, a 3 dB drop off should be taken as exemplary only.

The procedure continues to optional step 830 where the identified interference is filtered out. It should be noted that in accordance with alternative embodiments of the present invention, a differing interference remediation technique may be utilized other than filtering. Therefore, it should be noted that the description of filtering out the identified interference should be taken as exemplary only. The procedure 800 then completes in step 835.

Figures 9A, 9B, 9C:
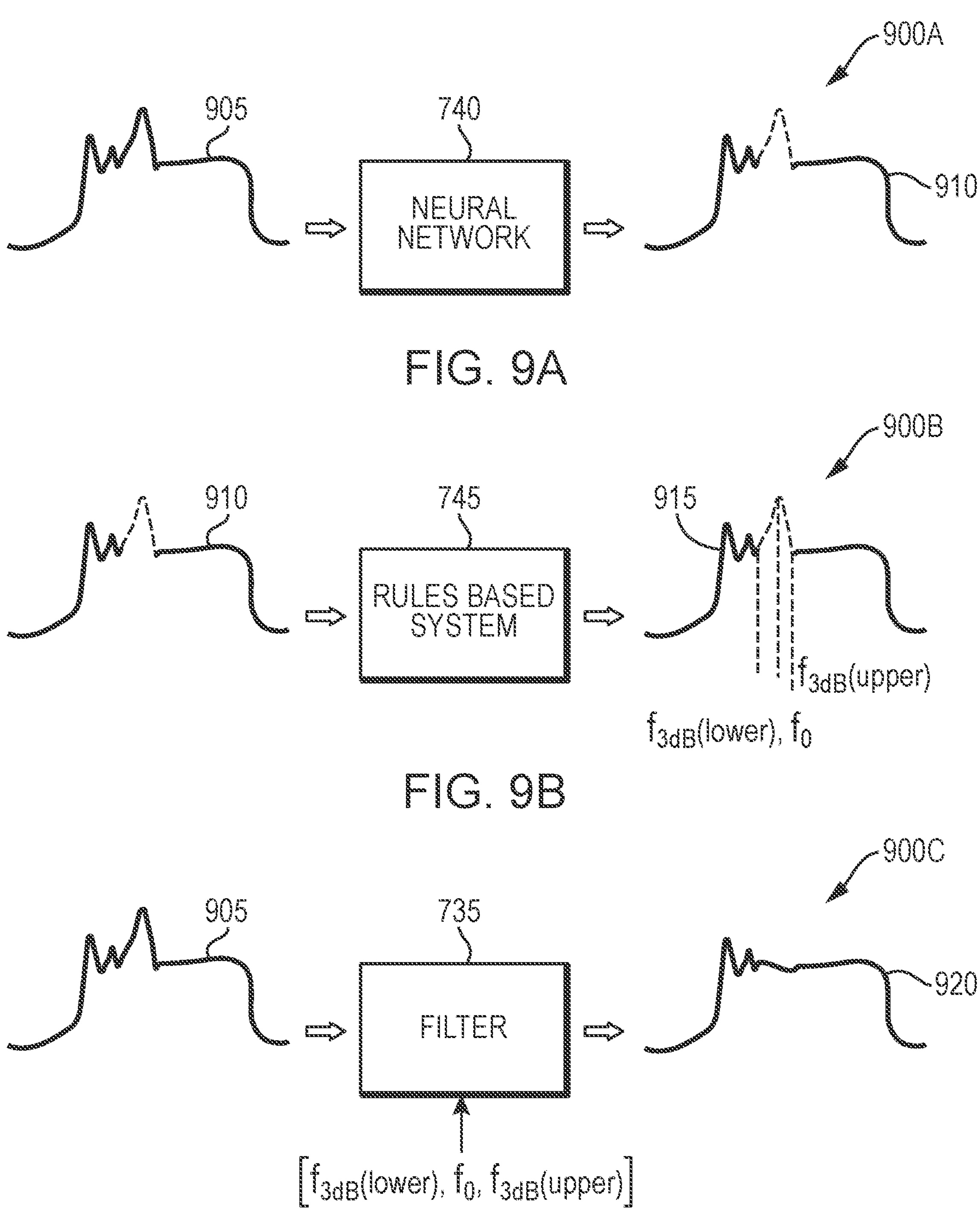
FIG. 9A is an exemplary diagram illustrating the identification of suspected interference in accordance with an illustrative embodiment of the present invention.
FIG. 9B is an exemplary diagram illustrating the use of rules-based system to identify interference in accordance with an illustrative embodiment of the present invention.
FIG. 9C is an exemplary diagram illustrating filtering of identified interference in accordance with an illustrative embodiment of the present invention.

FIGS. 9A-C illustrate operation of an illustrative embodiment of the present invention in a stylized block diagram format. FIG. 9A is an exemplary diagram 900A illustrating the identification of suspected interference in accordance with an illustrative embodiment of the present invention. An input RF signal 905 is fed into a neural network 740, which identifies a window of suspected interference (denoted in dashed lines) 910.

FIG. 9B is an exemplary diagram 900B illustrating the use of rules-based system to identify interference in accordance with an illustrative embodiment of the present invention. In diagram 900B, the input signal 910 with the suspected window of interference identified is fed into a rules-based interference detection system 745. The system identifies a center frequency ($f_0$) of the interference as well as the upper and lower frequencies of the interference ($f_{3\ dB}$(upper) and $f_{3\ dB}$(lower)). In this example, the power drop off level is set at 3 dB for determining the upper/lower frequencies. As noted above, differing power drop off levels may be utilized in accordance with alternative embodiments. Once the details of the interfering signal have been determined, appropriate remediation may occur.

FIG. 9C is an exemplary diagram 900C showing the optional filtering of identified interference in accordance with an illustrative embodiment of the present invention. In diagram 900C, the original signal 905 is fed into a filter 735 along with the parameters identified by the rules-based system, i.e., $f_0$, $f_{3\ dB}$(upper), and $f_{3\ dB}$(lower). As noted, filtering out interference is one example of remediation. In alternative embodiments of the present invention, alternative remediation techniques may be utilized. Further, the system may end with the output of the parameters without performing any remediation technique.

In environments where there are very clear indicia of interference, the use of the neural network to identify one or more windows may be skipped. In those environments, the rules-based system may be utilized alone.

Various embodiments of the present invention have been described herein. However, it should be noted that the principles of the present invention may be utilized in various alternative embodiments.

What is claimed is:

1. A computer implemented method comprising:

receiving a radio frequency (RF) signal at one or more antennas;

converting the received RF signal from a time domain to a frequency domain;

using a machine learning system on the converted RF signal to identify one or more windows of interference, when interference is present in the received RF signal;

providing each identified window of interference to a rules-based interference detection system; and identifying, using the rules-based interference detection system, a center frequency, an upper frequency, and a lower frequency for RF interference contained within the window of interference.

2. The computer implemented method of claim 1 further comprising filtering the RF interference contained within the window of interference contained within the window of interference to produce an RF signal that is free of interference.

3. The computer implemented method of claim 1 wherein converting the received RF signal from a time domain to a frequency domain comprises using a Fast Fourier Transform.

4. The computer implemented method of claim 1 wherein the upper frequency and lower frequency are set at a point where the interference contained in the window of interference is a predefined lower power level compared to the power level at the identified center frequency.

5. The computer implemented method of claim 4 wherein the predefined lower power level is 3 dB.

6. The computer implemented method of claim 1 further comprising remediating the identified interference contained within the window of interference.

7. The computer implemented method of claim 1 wherein the machine learning system is a neural network.

8. A system comprising:

a processor;

a machine learning module configured to analyze a received radio frequency signal to identify a window of interference;

a rules-based interference detection module configured to identify a center frequency and bandwidth for RF interference contained within the window of interference; and wherein an upper frequency and a lower frequency are set at a point where the interference contained in the window of interference is a predefined lower power level from the identified center frequency.

9. The system of claim 8 wherein the machine learning module is software executed by the processor.

10. The system of claim 8 wherein the machine learning module is implemented in hardware.

11. The system of claim 8 wherein the rules-based interference detection module is software executed by the processor.

12. The system of claim 8 wherein the rules-based interference detection module is implemented in hardware.

13. The system of claim 8 wherein the predefined lower power level is 3 dB.

14. The system of claim 8 further comprising a filter configured to filter the RF interference contained within the window of interference to produce a RF signal that is free of interference.

15. The system of claim 8 wherein the received RF signal is converted from a time domain to a frequency domain prior to analysis by the neural network module.

16. The system of claim 8 wherein the machine learning module is a neural network.

* * * * *